(12) United States Patent
Miwa (10) Patent No.: US 10,741,987 B2
(45) Date of Patent: Aug. 11, 2020

(54) LIGHT EMISSION APPARATUS, OBJECT INFORMATION DETECTION APPARATUS, OPTICAL PATH ADJUSTMENT METHOD, OBJECT INFORMATION DETECTION METHOD, AND LIGHT MODULATION UNIT

(71) Applicant: JNC CORPORATION, Tokyo (JP)

(72) Inventor: Tetsuharu Miwa, Chiba (JP)

(73) Assignee: JNC CORPORATION, Tokyo (JP)

( * ) Notice: Subject to any disclaimer, the term of this patent is extended or adjusted under 35 U.S.C. 154(b) by 0 days.

(21) Appl. No.: 16/251,072

(22) Filed: Jan. 18, 2019

(65) Prior Publication Data

US 2019/0229485 A1 Jul. 25, 2019

Related U.S. Application Data

(60) Provisional application No. 62/692,866, filed on Jul. 2, 2018.

(30) Foreign Application Priority Data

Jan. 19, 2018 (JP) .................................. 2018-007042

(51) Int. Cl.
*G01S 17/42* (2006.01)
*H01S 3/00* (2006.01)
(Continued)

(52) U.S. Cl.
CPC .............. *H01S 3/0085* (2013.01); *G01S 7/481* (2013.01); *G01S 7/4814* (2013.01); *G01S 7/4817* (2013.01);
(Continued)

(58) Field of Classification Search
CPC ............ G01B 9/02002; G01B 9/02091; G01B 9/02012; G01B 9/02063; G01B 9/02072;
(Continued)

(56) References Cited

U.S. PATENT DOCUMENTS 5,343,290 A 8/1994 Batchelder et al.
6,335,838 B1 * 1/2002 Kasai ................. G02B 27/0172
359/631

(Continued)

FOREIGN PATENT DOCUMENTS

EP 3418798 12/2018

OTHER PUBLICATIONS

"Partial Search Report of Europe Counterpart Application", dated Jul. 2, 2019, p. 1-p. 11.

(Continued)

*Primary Examiner* — Michael P Stafira
(74) *Attorney, Agent, or Firm* — JCIPRNET (57) ABSTRACT

A light emission apparatus comprises a light source that emits coherent light, a light modulation unit, a reflector, and a first light reception part. The reflector comprises a first reflection surface that is a part of a spherical surface and a second reflection surface that is different from the first reflection surface. Modulated light modulated by the light modulation unit is incident on the first reflection surface and its reflected light is emitted to an object. Unmodulated light that is not modulated by the light modulation unit and is reflected from the light modulation unit is incident on the second reflection surface and its reflected light is received by the first light reception part.

20 Claims, 4 Drawing Sheets

(51) Int. Cl.
*G01S 7/481* (2006.01)
*G02F 1/1335* (2006.01)
*G02B 26/08* (2006.01)
*G01S 17/89* (2020.01)
*G02B 27/30* (2006.01)
*H01S 3/094* (2006.01)

(52) U.S. Cl.
CPC .............. *G01S 17/42* (2013.01); *G01S 17/89* (2013.01); *G02B 26/08* (2013.01); *G02B 27/30* (2013.01); *G02F 1/1335* (2013.01); *G02F 1/133553* (2013.01); *H01S 3/00* (2013.01); *H01S 3/0071* (2013.01); *H01S 3/094* (2013.01)

(58) Field of Classification Search
CPC .............. G01B 9/0201; G01B 9/02031; G01B 11/002; G01B 11/03; G01B 11/14; G01B 11/272; G01B 2290/70; G01B 9/02019; G01B 9/02027; G01B 9/02065; G01B 9/02071; G01N 21/4795; G01N 21/45; G01N 29/2418; G01N 2021/1706; G01N 2021/3129; G01N 2021/4709; G01N 21/1702; G01N 21/4785; G01N 21/4738; G01N 21/55; G01N 2201/062; G01N 2201/0638; G01N 2201/068; G01N 2021/4778; G01N 21/21; G01N 21/211; G01N 21/274; G01N 21/276; G01N 21/35; G01N 21/474; G01N 21/49; G01N 21/7746; G01N 2201/0221; G01N 2201/08; G01N 2201/12707; G01N 2201/12723; G01N 2291/0255; G01N 2291/0256; G01N 2291/0427; G01N 29/022; G01N 29/036; G01N 33/4833; G02B 27/283; G02B 27/0172; G02B 2027/0178; G02B 27/0093; G02B 27/145; G02B 2027/0174; G02B 27/0025; G02B 27/1046; G02B 13/22; G02B 27/0176; G02B 27/141; G02B 6/12019; G02B 6/12021; G02B 2027/0123; G02B 2027/0134; G02B 2027/0138; G02B 2027/014; G02B 2027/0187; G02B 23/12; G02B 26/0833; G02B 27/0075; G02B 27/0103; G02B 127/017; G02B 27/1026; G02B 27/149; G02B 30/26; G02B 30/52; G02B 3/0087; G02B 5/04; G02B 5/1842; G02B 5/201; G02B 5/208; G02B 5/281; G02B 5/3016; G02B 6/0003; G02B 6/005; G02B 6/0076; G02B 17/086; G02B 2027/0118; G02B 26/02; G02B 26/04; G02B 26/08; G02B 27/09; G02B 27/0933; G02B 27/10; G02B 27/1033; G02B 27/14; G02B 27/281; G02B 27/286; G02B 27/30; G02B 30/25; G02B 30/54; G02B 3/0006; G02B 5/008; G02B 5/10; G02B 5/18; G02B 5/28; G02B 5/3033; G02B 5/3058; G02B 5/32; G02B 6/0046; G02B 6/0055; G02B 6/0068; G02B 6/26; G02B 6/3512; G02B 6/353; G02B 6/3554; G02B 6/2356; G02B 6/3576; G02B 6/3584; G02B 6/3594; G02B 6/4204; G02B 6/4246; G02B 6/4277; G02B 6/4284; G02B 6/4295; G02B 6/43; G01S 17/89; G01S 17/894; G01S 7/486; G01S 17/10; G01S 7/4816; G01S 7/484; G01S 7/4865; G01S 17/42; G01S 17/66; G01S 3/783; G01S 3/786; G01S 5/163; G01S 7/4808; G01S 7/491; G01S 17/36; G01S 17/48; G01S 17/88; G01S 5/0257; G01S 5/16; G01S 7/481; G01S 7/4813; G01S 7/4814; G01S 7/4817; G01S 7/4818; G01S 7/497; G01S 7/499; G01J 5/60; G01J 1/0219; G01J 2003/283; G01J 3/0218; G01J 3/027; G01J 3/0286; G01J 3/28; G01J 3/32; G01J 3/36; G01J 3/42; G01J 3/433; G01J 3/447

See application file for complete search history.

(56) References Cited

U.S. PATENT DOCUMENTS

| | | | |
|---|---|---|---|
| 2003/0081154 A1 | 5/2003 | Coleman et al. | |
| 2007/0052928 A1* | 3/2007 | Maeda | G02B 27/1026 353/20 |
| 2007/0273798 A1* | 11/2007 | Silverstein | G02B 13/22 348/752 |
| 2008/0204713 A1* | 8/2008 | Indermuehle | B01L 3/5085 356/72 |
| 2010/0265382 A1 | 10/2010 | Khalil et al. | |
| 2013/0020981 A1 | 1/2013 | Borchers et al. | |
| 2016/0049765 A1 | 2/2016 | Eldada | |
| 2016/0377706 A1 | 12/2016 | Keller et al. | |

OTHER PUBLICATIONS

Steven Serati, et al., "Beam combining using a Phased Array of Phased Arrays," IEEE, Dec. 2004, pp. 1-8.

Jihwan Kim, et al., "Wide-angle, nonmechanical beam steering using thin liquid crystal polarization gratings," SPIE Proceedings, vol. 7093, Aug. 2008, pp. 1-12.

"Search Report of Europe Counterpart Application", dated Oct. 30, 2019, p. 1-p. 9.

* cited by examiner

LIGHT EMISSION APPARATUS, OBJECT INFORMATION DETECTION APPARATUS, OPTICAL PATH ADJUSTMENT METHOD, OBJECT INFORMATION DETECTION METHOD, AND LIGHT MODULATION UNIT

CROSS-REFERENCE TO RELATED APPLICATION

This application claims the priority benefit of Japan application serial no. 2018-007042, filed on Jan. 19, 2018, and U.S. application Ser. No. 62/692,866, filed on Jul. 2, 2018. The entirety of the above-mentioned patent applications is hereby incorporated by reference herein and made a part of this specification.

TECHNICAL FIELD

The present invention relates to a light emission apparatus that emits predetermined light to an object, an object information detection apparatus that detects object information of an object, an optical path adjustment method that adjusts the optical path of light emitted to an object, an object information detection method that detects object information of an object, and a light modulation unit that emits modulated light and unmodulated light.

BACKGROUND ART

A light emission apparatus that generates desired modulated light using a spatial light modulator and emits the modulated light to an object, an apparatus that utilizes the reflected light from the object to detect information on the object, and other similar apparatuses are discussed/proposed (Patent Documents 1 and 2 and Non-Patent Documents 1 and 2). For example, the apparatus as described in Patent Document 1 relates to a three-dimensional-mapping two-dimensional-scanning time-of-flight-type lidar ranging apparatus and is configured to include a plurality of beam forming and steering photonic integrated circuit chips based on one-dimensional phased arrays. Each photonic integrated circuit chip is to form a laser beam and perform steering and includes at least one off-chip lens and at least one on-chip grating. On the other hand, the situational awareness sensor as described in Patent Document 2 comprises a laser configured to generate a collimated spot beam, a liquid crystal waveguide configured to guide the spot beam to the direction of a predetermined angle from the optical axis, a controller configured to issue command signals to the liquid crystal waveguide, a fixed mirror having a conical shape oriented along the optical axis, and a detector configured to sense a reflected component of the spot beam.

PRIOR ART DOCUMENTS

Patent Documents

[Patent Document 1] US 2016/049765 A
[Patent Document 2] US 2016/377706 A

Non-Patent Documents

[Non-Patent Document 1] S. Serati et al., "Beam combining using a Phased Array of Phased Arrays (PAPA)", IEEE Aerospace Conference (2002)
[Non-Patent Document 2] J. Kim et al., "Wide-angle, non-mechanical beam steering using thin liquid crystal polarization gratings", Proceedings, Proc. SPIE 7093, Advanced Wavefront Control: Methods, Devices, and Applications VI, 709302 (Aug. 28, 2008)

SUMMARY OF THE INVENTION

Problems to be Solved by the Invention

However, the apparatus as described in Patent Document 1 has a problem in that the cost increases because the plurality of photonic integrated circuit chips each including a spatial light modulator is arranged thereby to ensure the laser beam formation and the angle of difference in steering.

In the situational awareness sensor as described in Patent Document 2, the spot beam from the liquid crystal waveguide is scanned onto the conical mirror and the reflected light from the mirror is emitted to the side of an object. If the angle of the mirror varies by $\theta$, for example, the angle of reflection from the object to the detector varies by $2\theta$. Thus, in order to ensure certain detection accuracy, the angle of the mirror has to be adjusted with a high degree of accuracy.

The apparatus as described in Non-Patent Document 1 is provided with a spatial light modulator using a liquid crystal, but the beam angle that can be varied without significantly increasing the loss is about 3 degrees, which cannot be said to be a practical angular range as the light emission range. The apparatus as described in Non-Patent Document 2 ensures the scanning angle by stacking a plurality of liquid crystal panels, and the cost may thus be high.

The present invention therefore provides a light emission apparatus that can emit light over a wide angular range without requiring highly accurate adjustment of the light emission angle and with a simple configuration at reduced cost. The present invention further provides an object information detection apparatus, an optical path adjustment method, an object information detection method, and a light modulation unit that are used in such a light emission apparatus or use such a light emission apparatus.

Means for Solving the Problems

According to an aspect of the present invention, there is provided a light emission apparatus comprising a light source that emits coherent light, a light modulation unit, a reflector, and a first light reception part. The light emission apparatus is characterized by the following features. The reflector comprises a first reflection surface that is a part of a spherical surface and a second reflection surface that is different from the first reflection surface. Modulated light modulated by the light modulation unit is incident on the first reflection surface and its reflected light is emitted to an object. Unmodulated light that is not modulated by the light modulation unit and is reflected from the light modulation unit is incident on the second reflection surface and its reflected light is received by the first light reception part.

This allows the light to be emitted over a wide angular range without requiring highly accurate adjustment of the light emission angle and with a simple configuration at reduced cost.

In the light emission apparatus of the present invention, the second reflection surface may preferably be a flat surface or a curved surface that has a curvature different from that of the first reflection surface. In this configuration, the position of the center of curvature of the first reflection surface may preferably the same as that of the second reflection surface.

In the light emission apparatus of the present invention, the second reflection surface may preferably be a part of a spherical surface that forms the first reflection surface and provided in a region different from that of the first reflection surface.

In the light emission apparatus of the present invention, the light modulation unit may preferably comprise a transmission part and a light modulation part that are arranged in this order from the light source side along an optical path of emitted light from the light source, the modulated light modulated by the light modulation part may preferably be incident on the first reflection surface, and the unmodulated light that is not modulated by the light modulation part and is reflected by the transmission part or the light modulation part may preferably be incident on the second reflection surface. In this configuration, the light modulation part may be a spatial light modulator that modulates incident light and emits the modulated light, and the transmission part may be a cover glass disposed on an incident surface of the spatial light modulator. This light modulation unit may preferably be a liquid crystal panel or an LCOS (Liquid Crystal On Silicon) that has a liquid crystal layer, or a microelectromechanical system that has a plurality of movable mirrors. The transmission part of the light modulation unit may preferably include one or more plate materials having transparency that are disposed on the light source side than the liquid crystal layer or the movable mirrors. The transmission part may preferably have a transmissivity of 80-95% for a component of incident light having a high transmission factor. The transmission part may preferably have a reflectance of 3-20% for incident light at an interface with air.

In the light emission apparatus of the present invention, the spherical surface may preferably be a part of a convex mirror having a convex surface facing the object side or a part of a concave mirror having a concave surface facing the object side.

In the light emission apparatus of the present invention, the light source may preferably be a laser light source. Here, the light emission apparatus may further preferably comprise a collimating optical system that collimates emitted light from the laser light source into collimated light and emits the collimated light to the light modulation unit.

In the light emission apparatus of the present invention, the light emission apparatus may preferably comprise a state detection part that detects a state of the reflector on the basis of a light reception result obtained in the first light reception part and a modulated light adjustment part that controls the modulated light on the basis of a detection result obtained by the state detection part. In this configuration, the modulated light adjustment part may control the light modulation part so as to change an emission direction of the modulated light from the light modulation part on the basis of the detection result obtained by the state detection part. In addition or alternatively, the modulated light adjustment part may preferably adjust the direction of the reflector so as to change a reflection direction of the modulated light at the first reflection surface on the basis of the detection result obtained by the state detection part.

According to another aspect of the present invention, there is provided an object information detection apparatus. The object information detection apparatus is characterized by comprising any one of the above light emission apparatuses, a second light reception part that receives the modulated light reflected from the object, and an object information detection part that detects object information of the object on the basis of a light reception result obtained in the second light reception part.

The object information detection apparatus of the present invention may preferably comprise a state detection part that detects a state of the reflector on the basis of a light reception result obtained in the first light reception part and a coordinate system setting part that sets a coordinate system on the basis of a detection result obtained by the state detection part, and the object information detection part may preferably detect the position of the object in the coordinate system set by the coordinate system setting part, on the basis of the light reception result obtained in the second light reception part.

This allows the object information detection to be highly accurately executed over a wide angular range with a simple configuration at reduced cost.

According to still another aspect of the present invention, there is provided an optical path adjustment method for adjusting an optical path of a modulated light reflected and emitted by a reflector, when the modulated light modulated in a light modulation unit is emitted to be reflected by a reflector and emitted to an object. The optical path adjustment method is characterized by the following features. The reflector comprises a first reflection surface that is a part of a spherical surface and a second reflection surface that is different from the first reflection surface. The optical path adjustment method comprises an incident step in which coherent light is given to the light modulation unit, the modulated light modulated by the light modulation unit is incident on the first reflection surface, and unmodulated light that is not modulated by the light modulation unit and is reflected from the light modulation unit is incident on the second reflection surface, a state detection step in which a state of the reflector is detected on the basis of reflected light from the second reflection surface, and a step in which the modulated light is controlled on the basis of the state of the reflector detected in the state detection step.

This allows the optical path of the emitted light to be highly accurately adjusted over a wide angular range with a simple configuration at reduced cost.

According to yet another aspect of the present invention, there is provided an object information detection method characterized by comprising: causing modulated light modulated in a light modulation unit to be reflected at a reflector and emitted to an object, the reflector comprising a first reflection surface that is a part of a spherical surface and a second reflection surface that is different from the first reflection surface; giving coherent light to the light modulation unit, causing the modulated light modulated by the light modulation unit to be incident on the first reflection surface, and causing unmodulated light that is not modulated by the light modulation unit and is reflected from the light modulation unit to be incident on the second reflection surface; causing reflected light from the first reflection surface to be emitted to the object; detecting a state of the reflector and setting a coordinate system on the basis of reflected light from the second reflection surface; and detecting object information of the object on the basis of a light reception result of the modulated light reflected from the object.

This allows the object information detection to be highly accurately executed over a wide angular range with a simple configuration at reduced cost.

According to a further aspect of the present invention, there is provided a light modulation unit comprising a transmission part and a light modulation part that are arranged in this order from a light source side along an optical path of emitted light from the light source. The light source emits coherent light. The light modulation unit is characterized by the following features. The light modulation unit emits modulated light modulated by the light modulation part and unmodulated light that is not modulated by the light modulation part and is reflected by the transmission part or the light modulation part. The modulated light and at least a part of the unmodulated light are emitted at emission angles that are different from each other with respect to an emission surface of the light modulation unit.

In the light modulation unit of the present invention, the transmission part may preferably have a transmissivity of 80-95% for a component of incident light having a high transmission factor. In addition or alternatively, the transmission part may preferably have a reflectance of 3-20% for incident light.

This allows the light emission angle to be easily adjusted and also allows the modulated light to be emitted over a wide angular range with a simple configuration at reduced cost.

Effect of the Invention

According to the present invention, it is possible to provide a light emission apparatus that can emit light over a wide angular range without requiring highly accurate adjustment and with a simple configuration at reduced cost.

Moreover, it is possible to provide an object information detection apparatus, an optical path adjustment method, an object information detection method, and a light modulation unit that are used in such a light emission apparatus or use such a light emission apparatus.

MODE(S) FOR CARRYING OUT THE INVENTION

Hereinafter, the light emission apparatus, object information detection apparatus, optical path adjustment method, object information detection method, and light modulation unit according to one or more embodiments of the present invention will be described in detail with reference to the drawings.

<Light Emission Apparatus and Light Modulation Unit>

Figure 1:
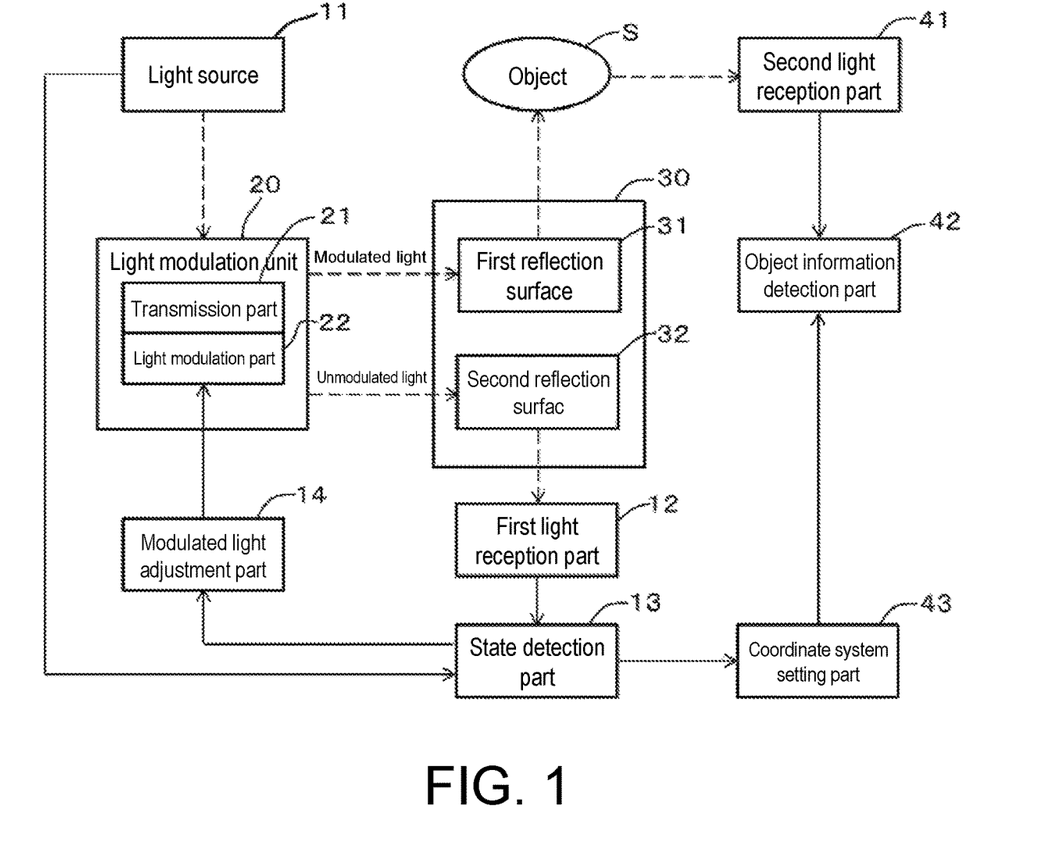
FIG. 1 is a block diagram conceptually illustrating the configuration of a light emission apparatus and an object information detection apparatus according to one or more embodiments of the present invention.

FIG. 1 is a block diagram conceptually illustrating the configuration of the light emission apparatus and object information detection apparatus according to the present embodiment. As illustrated in FIG. 1, the light emission apparatus according to the present embodiment comprises a light source 11, a light modulation unit 20, a reflector 30, and a first light reception part 12. Preferably, the light emission apparatus further comprises a state detection part 13 and a modulated light adjustment part 14.

The light source 11 is a light source that emits coherent light, for example, a laser light source that emits a Gaussian beam. The light source 11 is preferably provided with a collimating optical system that collimates the emitted light from the light source 11 into collimated light and emits the collimated light to the light modulation unit 20.

The light modulation unit 20 comprises a transmission part 21 and a light modulation part 22 that are arranged in this order from the light source 21 side along the optical path of emitted light from the light source 11.

One form of the light modulation unit 20 employs a configuration in which the light modulation part 22 is a spatial light modulator that modulates incident light and emits the modulated light and the transmission part 22 is a cover glass disposed on the incident surface of the spatial light modulator.

Another form of the light modulation unit 20 uses a liquid crystal panel or an LCOS that has a liquid crystal layer, and the transmission part 21 is configured to be disposed on the light source side than the liquid crystal layer and include one or more plate materials having transparency.

Still another form of the light modulation unit 20 uses a microelectromechanical system that includes a plurality of movable mirrors, and the transmission part 21 is configured to be disposed on the light source side than the movable mirrors and include one or more plate materials having transparency.

In any of the above three forms of the light modulation unit 20, the transmission part 21 preferably has a transmissivity of 80-95% for a component of incident light having a high transmission factor. This allows the incident light to be balanced on a first reflection surface 31 and a second reflection surface 32 of the reflector 30, and the light modulation unit 20 can therefore emit modulated light sufficient for detecting the object information of an object S and emit unmodulated light sufficient for optical path adjustment to the second reflection surface 32 side.

The transmission part 21 preferably has a reflectance of 3-20% for incident light at the interface with air. This allows the incident light to be balanced on the first reflection surface 31 and second reflection surface 32 of the reflector 30, and the light modulation unit 20 can therefore emit the modulated light sufficient for detecting the object information of the object S and emit the unmodulated light sufficient for optical path adjustment to the second reflection surface 32 side.

The light modulation part 22 modulates the light having passed through the transmission part 21 and emits the modulated light. The traveling direction of the emitted light from the light modulation part 22 can be adjusted by the modulated light adjustment part 14 and is set to a direction different from that of the reflected light from the transmission part 21.

The light modulation unit 20 having the above configuration emits the modulated light modulated by the light modulation part 22 and the unmodulated light that is not modulated by the light modulation part 22 and is reflected by the transmission part 21 or the light modulation part 22. The modulated light in the light modulation part 22 and at least a part of the unmodulated light reflected by the transmission part 21 are emitted at emission angles that are different from each other with respect to the emission surface of the light modulation unit 20. Such a difference in the emission angle can be achieved, for example, by change or adjustment of the material, thickness, or arrangement of a member that constitutes the transmission part 21, or surface treatment or addition of a surface layer to the transmission part 21 and/or the light modulation part 22.

The reflector 30 comprises the first reflection surface 31 composed of a part of a spherical surface and the second reflection surface 32 different from the first reflection surface 31. The modulated light modulated by the light modulation unit 20 is incident on the first reflection surface 31 and its reflected light is emitted to the object S. The unmodulated light that is not modulated by the light modulation unit 20 and is reflected primarily by the transmission part 21 is incident on the second reflection surface 32 and its reflected light is received by the first light reception part 12. This unmodulated light includes unmodulated light that is reflected by the transmission part 21 or the light modulation part 22.

The spherical surface that constitutes the first reflection surface 31 may be a part of a convex mirror having a convex surface facing the object S side or a part of a concave mirror having a concave surface facing the object S side.

The second reflection surface 32 can be formed, for example, as a flat surface or a curved surface that has a curvature different from that of the first reflection surface 31. When the second reflection surface 32 is formed as a curved surface that has a curvature different from that of the first reflection surface 31, the first reflection surface 31 and the second reflection surface 32 may be configured such that the position of the center of curvature of the first reflection surface 31 is the same as that of the second reflection surface 32.

In another form of the second reflection surface 32, the second reflection surface can be a part of a spherical surface that forms the first reflection surface 31 and provided in a region different from that of the first reflection surface 31.

Various types of optical sensors can be used as the first light reception part 12. The unmodulated light reflected from the second reflection surface 32 of the reflector 30 is incident on the first light reception part 12, which can detect the incident light intensity. The detection result obtained by the first light reception part 12 is output to the state detection part 13.

The state detection part 13 detects the state of the reflector 30 on the basis of the detection result obtained in the first light reception part 12. Examples of the state of the reflector 30 include an arrangement angle of the second reflection surface 32, and this angle corresponds to an arrangement angle of the entire reflector 30. Information on the intensity of the emitted light from the light source 11 is also input to the state detection part 13, which can calculate the angle of the second reflection surface 32 of the reflector 30 from the relationship between the emitted light intensity and the received light intensity detected by the first light reception part 12. Shapes and optical characteristics of the reflector 30 and the light modulation part 22 are preliminarily stored in the state detection part 13. These data can be used to calculate the attitude of the reflector 30 and the angle of the first reflection surface 31 on the basis of the arrangement angle of the second reflection surface 32 and it is thereby possible to calculate the traveling direction of the reflected light from the first reflection surface 31 and its emission intensity.

The modulated light adjustment part 14 controls the modulated light on the basis of the detection result obtained by the state detection part 13. In this control, for example, the emission direction of the modulated light from the light modulation part 22 is varied on the basis of the attitude of the reflector 30 detected by the state detection part 13 so that the traveling direction of the reflected light from the first reflection surface 31 becomes a desired direction.

<Object Information Detection Apparatus>

The object information detection apparatus according to the present embodiment comprises, in addition to the above-described light emission apparatus, a second light reception part 41 and an object information detection part 42. Preferably, this object information detection apparatus further comprises a coordinate system setting part 43.

The second light reception part 41 receives the modulated light reflected from the object S. Various types of optical sensors can be used as the second light reception part 41, provided that it can detect the intensity of the modulated light. The detection result is output to the object information detection part 42.

The object information detection part 42 detects the object information of the object S on the basis of the light reception result obtained in the second light reception part 41. Examples of the object information of the object S include the position, direction, shape, and color of the object S.

The coordinate system setting part 43 sets a coordinate system on the basis of the detection result obtained by the state detection part 13. Information on the set coordinate system is output to the object information detection part 42, which detects the position and the like of the object S in the coordinate system set by the coordinate system setting part 43, on the basis of the light reception result obtained in the second light reception part 41.

<Optical Path Adjustment Method>

The optical path adjustment method of the present embodiment includes the following steps in which, when the modulated light modulated in the light modulation unit 20 is reflected by the reflector 30 and emitted to the object S side, the optical path of the emitted, modulated light is adjusted.

(1) Incident Step

When coherent light is given to the light modulation unit 20 from the light source 11, the light modulation unit 20 emits the modulated light, which is modulated by the light modulation part 22, and the unmodulated light, which is not modulated by the light modulation part 22 and is reflected primarily by the transmission part 21, to the reflector 30 side. Adjustment by the modulated light adjustment part 14 allows the traveling direction of the modulated light emitted from the light modulation part 22 to be set different from the traveling direction of the unmodulated light which includes the reflected light from the transmission part 21. Thus, the modulated light emitted from the light modulation unit 20 is primarily incident on the first reflection surface 31 while the unmodulated light is primarily incident on the second reflection surface 32 (incident step). Moreover, the modulated light reflected by the first reflection surface 31 is emitted to the object S side while the unmodulated light reflected by the second reflection surface 32 is received by the first light reception part 12.

(2) State Detection Step

The unmodulated light reflected from the second reflection surface 32 of the reflector 30 is incident on the first light reception part 12, which detects the incident light intensity. This detection result is output to the state detection part 13, which detects the state of the reflector 30 on the basis of the detection result (state detection step). The detection result obtained by the state detection part 13 is output to the modulated light adjustment part 14 and the coordinate system setting part 43.

(3) Modulated Light Control Step

The modulated light adjustment part 14 outputs a control signal to the light modulation part 22 on the basis of the state of the reflector 30 detected by the state detection part 13 (modulate light control step). Receiving the control signal, the light modulation part 22 adjusts the angle of a member that constitutes the light modulation part 22, thereby to adjust the optical path, emission angle, and emission range of the modulated light, etc. In addition or alternatively, for example, the modulated light adjustment part 14 can adjust not only the optical path but also the emitted light intensity of the modulated light from the light modulation part 22.

<Object Information Detection Method>

In the object information detection method of the present embodiment, the object information of the object S is detected by executing the following steps (4) and (5) in addition to the above-described steps (1) to (3) of the optical path adjustment method.

(4) Coordinate System Setting Step

The detection result obtained by the state detection part 13 in the above state detection step is output to the coordinate system setting part 43, which sets the coordinate system on the basis of the detection result obtained by the state detection part 13. Information on the set coordinate system is output to the object information detection part 42.

(5) Object Information Detection Step

The modulated light reflected from the object S is incident on the second light reception part 41, which detects the incident light intensity. This detection result is output to the object information detection part 42. The object information detection part 42, which stores information on the coordinate system set in the coordinate system setting step, detects the position, direction, shape, color, etc. of the object S in the coordinate system set by the coordinate system setting part 43, on the basis of the detection result obtained in the second light reception part 41.

Examples of the present embodiment will be described below.

Example 1

Figure 2:
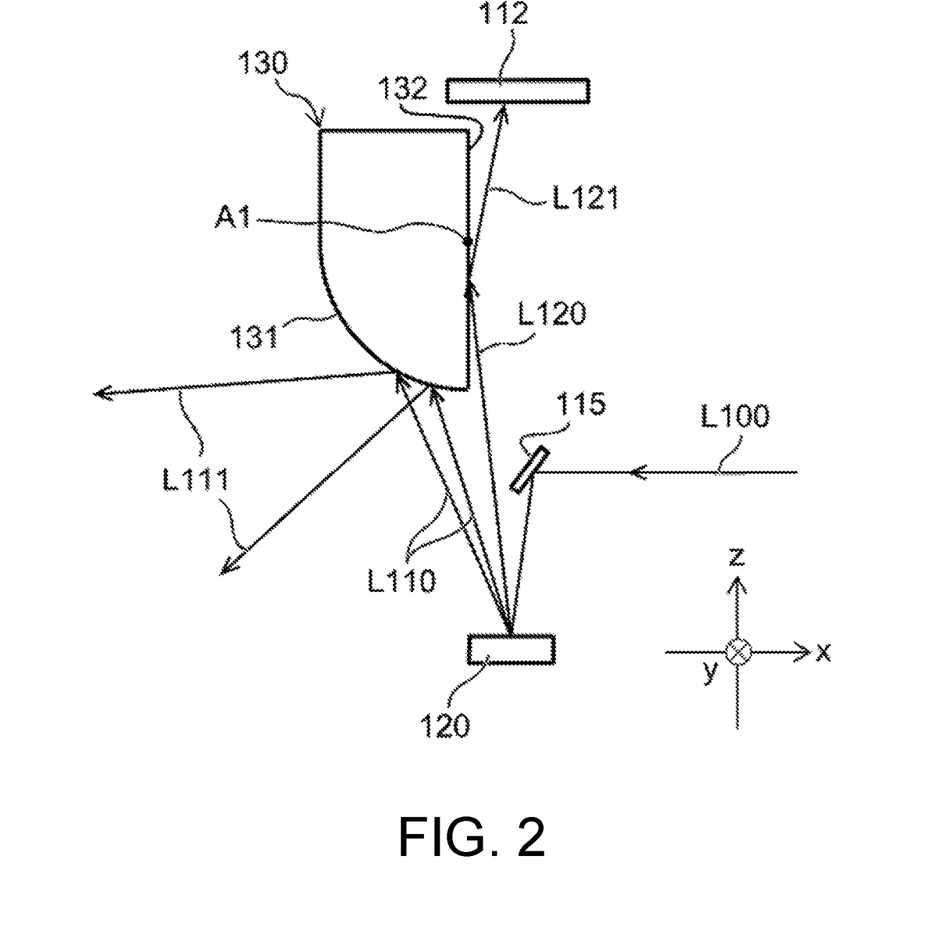
FIG. 2 is a diagram illustrating the configuration of a light emission apparatus according to Example 1.

FIG. 2 is a diagram illustrating the configuration of a light emission apparatus according to Example 1. Tables 1 and 2 are tables which list the simulation results obtained by the configuration of the light emission apparatus according to Example 1.

The schematic configuration of the light emission apparatus of Example 1 will be described.

As illustrated in FIG. 2, the light emission apparatus according to Example 1 comprises a light modulation unit 120, a reflector 130, a first light reception part 112, a flat mirror 115, and a light source which is not illustrated. The reflector 130 has a first reflection surface 131 and a second reflection surface 132. An emitted light beam L100 from the light source is reflected by the flat mirror 115 and incident on the light modulation unit 120. The light modulation unit 120 emits modulated light beams L110 and an unmodulated light beam L120. The modulated light beams L110 are incident on the first reflection surface 131 of the reflector 130 and emitted as reflected light beams L111 to the object side. The unmodulated light beam L120 is incident on the second reflection surface 132 of the reflector 130 and incident on the first light reception part 112 as a reflected light beam L121.

Conditions and results of simulations listed in Tables 1 and 2 will then be described.

The reflector 130 has a configuration in which the first reflection surface 131 and the second reflection surface 132 are provided in respective different regions of one resin material. The surface shape of the first reflection surface 131 was given as a hemispherical surface as a part of a spherical surface having a radius of 4 mm while the second reflection surface 132 was given as a flat surface passing through the spherical center A1 of the above spherical surface. Metal plating was applied to the surfaces of the first reflection surface 131 and the second reflection surface 132 to form mirror surfaces.

A reflection-type spatial light modulator was selected as the light modulation unit 120, and a cover glass as the transmission part having a thickness of 0.7 mm and a refractive index of 1.50 was disposed on the light source side of the spatial light modulator (at the surface on the flat mirror 115 side).

The light source (not illustrated) was set to emit a Gaussian beam having a radius of 200 μm. The emitted light beam L100 from the light source is reflected by the flat mirror 115 and incident on the light modulation unit 120. In the example illustrated in FIG. 2, two modulated light beams L110 having emission angles different from each other are incident on different positions of the first reflection surface 131 of the reflector 130, and respective reflected light beams travel in directions different from each other. The unmodulated light beam L120 is primarily incident on the second reflection surface 132.

Here, the coordinate system was defined to describe the positional relationship of the entire light emission apparatus. The point of origin was set to the plane center of the surface of the spatial light modulator and on the interface between the cover glass and air. The x axis was defined as the projection of the straight line connecting the point of origin and the center A1 of the spherical surface of the first reflection surface 131 onto the plane on which the light modulation unit 120 was disposed. The z axis was set so as to be parallel to the normal vector of the plane on which the light modulation unit 120 was disposed. The y axis was defined to be perpendicular to the x axis and the z axis and in the right-handed system. The unit of the coordinate system was represented by mm.

In the above coordinate system, the second reflection surface 132 was arranged so that its normal vector was parallel to the x axis. The reflector 130 was arranged so that the second reflection surface 132 was disposed on the side closer to the point of origin and the first reflection surface 131 was disposed on the side farther from the point of origin. The coordinate of the center A1 of the spherical surface of the first reflection surface 131 was set to (4.7, 0, 54).

The Gaussian beam emitted from the light source and reflected by the flat mirror 115 was made incident on the light modulation unit 120 with a vector (0.087, 0, −0.996) so that the center of the Gaussian beam faced the point of origin.

The first light reception part 112 (photosensor array) was disposed on a position of z=100 mm so as to be parallel to the xy plane. In this first light reception part 112, five observation points were defined: A (2.17, 0, 100), B (2.1, 0, 100), C (2.2, 0.06, 100), D (2.2, −0.06, 100), and E (2.17, 0.07, 100). The received light intensity ratio of the reflected light beam L121 of the unmodulated light beam L120 was 1:0.79:0.79:0.79:0.79 (see Table 1) at these observation points when there was no error.

TABLE 1

Example 1 Received light intensity of photosensor array

| | Observation point | | | | |
|---|---|---|---|---|---|
| | A | B | C | D | E |
| Without error | 1.00 | 0.79 | 0.79 | 0.79 | 0.79 |
| x + 0.1 mm | 0.37 | 0.74 | 0.23 | 0.23 | 0.30 |
| x − 0.1 mm | 0.37 | 0.18 | 0.41 | 0.41 | 0.30 |

TABLE 1-continued

Example 1 Received light intensity of photosensor array

| | Observation point | | | | |
|---|---|---|---|---|---|
| | A | B | C | D | E |
| y + 0.1 mm | 0.37 | 0.29 | 0.59 | 0.19 | 0.74 |
| y − 0.1 mm | 0.37 | 0.29 | 0.19 | 0.59 | 0.18 |
| z + 0.1 mm | 1.00 | 0.79 | 0.79 | 0.79 | 0.79 |
| z − 0.1 mm | 1.00 | 0.79 | 0.79 | 0.79 | 0.79 |
| Beam incident angle Elevation angle +0.2° | 0.03 | 0.00 | 0.01 | 0.01 | 0.00 |
| Beam incident angle Elevation angle −0.2° | 0.03 | 0.02 | 0.00 | 0.00 | 0.00 |
| Beam incident angle Azimuth angle +0.2° | 0.46 | 0.58 | 0.36 | 0.92 | 0.35 |
| Beam incident angle Azimuth angle −0.2° | 0.46 | 0.58 | 0.92 | 0.36 | 1.00 |

Here, Table 1 is a table summarizing the influence of the positioning error of the reflector 130 and the incident angle error of the reflected light beam L121 to the first light reception part 112 on the received light intensity at each of the measurement points A to E. In Table 1, "x+0.1 mm" means that the positioning error of the reflector 130 is 0.1 mm in the positive direction of the x-axis, and "x−0.1 mm" means that the positioning error of the reflector 130 is 0.1 mm in the negative direction of the x-axis. Likewise, "y+0.1 mm" refers to the positioning error of the reflector 130 in the positive direction of the y axis, "y−0.1 mm" refers to the positioning error of the reflector 130 in the negative direction of the y axis, "z+0.1 mm" refers to the positioning error of the reflector 130 in the positive direction of the z axis, "z−0.1 mm" refers to the positioning error of the reflector 130 in the negative direction of the z axis, and each error is 0.1 mm.

The "beam incident angle" in Table 1 is an incident angle of the reflected light beam L121 to the first light reception part 112, and the elevation angle refers to a relative angle variation from the vector (0, 0, 1), where the direction in which the relative angle decreases is positive while the direction in which the relative angle increases is negative. The operation of the azimuth angle refers to an operation in which the rotation axis is an axis parallel to the vector (0, 0, 1). It has been found from Table 1 that the shape of the reflector 130 of Example 1 allows the errors other than parallel movement in the z-axis direction to be detected as changes in the received light intensity ratio between the observation points.

In the light modulation unit 120, the spatial light modulator modulates the incident light. The upper limit of the modulation angle was set to an angle defined by 3 (degrees)÷180×π (steradian) with respect to the center in the traveling direction of the unmodulated light beam L120 reflected by the cover glass in the light modulation unit 120. The lower limit of the modulation angle was set to an angle that gave a difference of 1 mm or more between the x components of the coordinates at which the unmodulated light and the modulated light were incident on the reflector 130.

A vector (1, 0, 0) was used as the reference for the emission angles of the reflected light beams L111 from the first reflection surface 131. Table 2 lists the range of the relative angle after the modulated light is reflected by the first reflection surface 131. As in Table 1, the elevation angle in Table 2 refers to the relative angle variation from the vector (0, 0, 1), where the direction in which the relative angle decreases is positive while the direction in which the relative angle increases is negative. The operation of the azimuth angle refers to an operation in which the rotation axis is an axis parallel to the vector (0, 0, 1). The positive and negative in the direction of rotation conform to those in the rotation operation in the right-handed system. Table 2 also lists the positioning errors of the reflector 130, the relative angular ranges of the reflected light beams L111 when the incident angle errors of the modulated light beams L110 to the first reflection surface 131 occur, and the modulation amounts for canceling the emission angle errors of the reflected light beams L111.

TABLE 2

Example 1 Influence on scanning angle given by errors, and correction amount

| Correction amount | Scanning range when not corrected | | Correction amount | Maximum value of residual error |
|---|---|---|---|---|
| | xy plane | xz plane | | |
| Without error | −24°–+24° | −84°–+20° | — | — |
| x + 0.1 mm | −32°–+32° | −83°–+16° | Elevation angle −0.12° Azimuth angle 0° | 0.005° |
| x − 0.1 mm | −29°–+29° | −83°–+17° | Elevation angle 0.1° Azimuth angle 0° | 0.002° |
| y + 0.1 mm | −32°–+19° | −84°–+21° | Elevation angle 0° Azimuth angle 1.2° | 0.003° |
| z + 0.1 mm | −26°–+26° | −84°–+20° | Elevation angle −0.15° Azimuth angle 0° | 0.003° |
| z − 0.1 mm | −24°–+24° | −84°–+21° | Elevation angle 0.12° Azimuth angle 0° | 0.001° |
| Beam incident angle Elevation angle +0.2° | −26°–+26° | −84°–+22° | Elevation angle −0.2° Azimuth angle 0° | 0.001° |
| Beam incident angle Elevation angle −0.2° | −18°–+18° | −84°–+18° | Elevation angle 0.2° Azimuth angle 0° | 0.001° |
| Beam incident angle Azimuth angle +0.5° | −36°–+17° | −84°–+20° | Elevation angle 0° Azimuth angle −0.5° | 0.001° |

As listed in Table 2, a scanning angle of 48° in the projection onto the xy plane and a scanning angle of 153° in the projection onto the xz plane were obtained. The operation of correction was performed by rotating the angular region including the modulated light in the directions of the elevation angle and azimuth angle. Table 2 also lists the operation amounts. Within the error ranges listed in Table 2, correction was possible with an angular error of 0.005° or less by operating the elevation angle up to 0.2°.

Example 2

Figure 3:
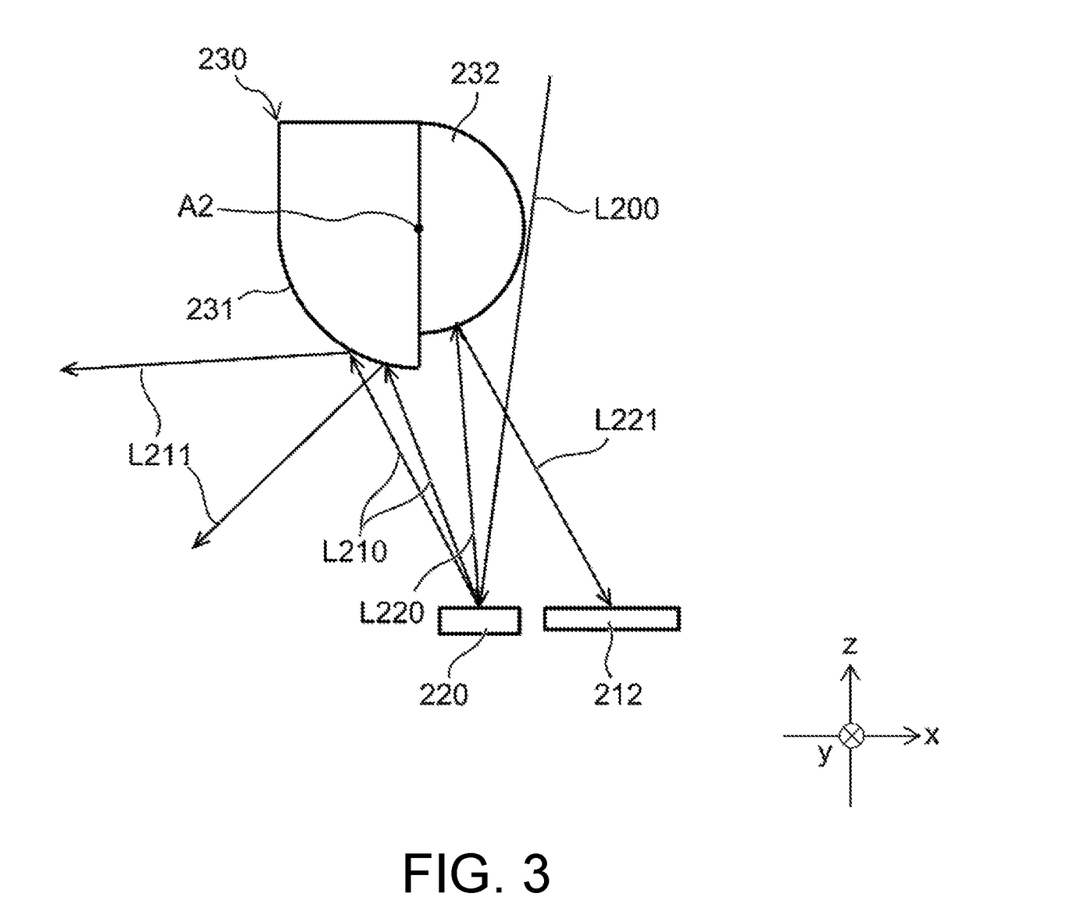
FIG. 3 is a diagram illustrating the configuration of a light emission apparatus according to Example 2.

FIG. 3 is a diagram illustrating the configuration of a light emission apparatus according to Example 2. Table 3 is a table which lists the simulation results obtained by the configuration of the light emission apparatus according to Example 2.

The schematic configuration of the light emission apparatus of Example 2 will be described.

As illustrated in FIG. 3, the light emission apparatus according to Example 2 comprises a light modulation unit 220, a reflector 230, a first light reception part 212, and a light source which is not illustrated. The reflector 230 has a first reflection surface 231 and a second reflection surface 232. An emitted light beam L200 from the light source is incident on the light modulation unit 220, which emits modulated light beams L210 and an unmodulated light beam L220. The modulated light beams L210 are incident on the first reflection surface 231 of the reflector 230 and emitted as reflected light beams L211 to the object side. The unmodulated light beam L220 is incident on the second reflection surface 232 of the reflector 230 and incident on the first light reception part 212 as a reflected light beam L221. Here, the first light reception part 212 and the light modulation unit 220 were disposed on the same plane.

Conditions and results of simulations listed in Table 3 will then be described.

The reflector 230 comprises the first reflection surface 231 and the second reflection surface 232 which are formed of a resin material. The first reflection surface 231 was formed as a part of a spherical surface having a radius of 4 mm while the second reflection surface 232 was formed as a part of a spherical surface having a radius of 3 mm and sharing the center A2 with the spherical surface constituting the first reflection surface 231. Metal plating was applied to the surfaces of the first reflection surface 231 and the second reflection surface 232 to form mirror surfaces.

TABLE 3

Example 2 Received light intensity of photosensor array

|  | Observation point | | | | |
| --- | --- | --- | --- | --- | --- |
|  | A | B | C | D | E |
| Without error | 1.00 | 0.79 | 0.79 | 0.79 | 0.79 |
| x + 0.1 mm | 0.61 | 0.96 | 0.34 | 0.33 | 0.57 |
| x − 0.1 mm | 0.61 | 0.24 | 0.68 | 0.68 | 0.57 |
| y + 0.1 mm | 0.61 | 0.47 | 0.87 | 0.26 | 0.40 |
| y − 0.1 mm | 0.61 | 0.47 | 0.26 | 0.87 | 0.81 |
| z + 0.1 mm | 0.69 | 0.99 | 0.40 | 0.40 | 0.65 |
| z − 0.1 mm | 0.69 | 0.30 | 0.73 | 0.73 | 0.65 |
| Beam incident angle Elevation angle +0.2° | 0.99 | 0.77 | 0.85 | 0.70 | 0.88 |
| Beam incident angle Elevation angle −0.2° | 0.99 | 0.77 | 0.70 | 0.85 | 0.98 |
| Beam incident angle Azimuth angle +0.2° | 0.15 | 0.03 | 0.24 | 0.24 | 0.14 |
| Beam incident angle Azimuth angle −0.2° | 0.18 | 0.04 | 0.27 | 0.27 | 0.17 |

As in Example 1, a reflection-type spatial light modulator was selected as the light modulation unit 220, and a cover glass as the transmission part having a thickness of 0.7 mm and a refractive index of 1.50 was disposed on the light source side of the spatial light modulator.

As in Example 1, the light source (not illustrated) was set to emit a Gaussian beam having a radius of 200 μm. The emitted light beam L200 from the light source is incident on the light modulation unit 220. In the example illustrated in FIG. 3, two modulated light beams L210 having emission angles different from each other are incident on different positions of the first reflection surface 231 of the reflector 230, and respective reflected light beams travel in directions different from each other. The unmodulated light beam L220 is primarily incident on the second reflection surface 232.

Also in Example 2, as in Example 1, the coordinate system was defined to describe the positional relationship of the entire light emission apparatus. The x axis was defined as the projection of the straight line connecting the point of origin and the center A2 of the spherical surface of the first reflection surface 231 onto the plane on which the first light reception part 212 and the light modulation unit 220 were disposed.

The second reflection surface 232 is provided on the flat surface possessed by the reflector 230, and the center A2 of the spherical surface of the second reflection surface 232 is located on that flat surface. The flat surface on which the second reflection surface 232 is provided has a normal vector parallel to the x axis. The reflector 230 was arranged so that the second reflection surface 232 was disposed on the side closer to the point of origin and the first reflection surface 231 was disposed on the side farther from the point of origin. The coordinate of the center A2 of the spherical surfaces of the first reflection surface 231 and second reflection surface 232 was set to (4.7, 0, 54).

The Gaussian beam emitted from the light source was made incident on the light modulation unit 220 with a vector (0.087, 0, −0.996) so that the center of the Gaussian beam faced the point of origin.

The first light reception part 212 (photosensor array) was disposed on a position of z=0 mm so as to be parallel to the xy plane. In this first light reception part, five observation points were defined: A (1.7, 0, 0), B (4.9, 0, 0), C (0.6, 2.0, 0), D (0.6, −2.0, 0), and E (1.7, 2.3, 0). The received light intensity ratio of the reflected light beam L221 of the unmodulated light beam L220 was 1:0.79:0.79:0.79:0.79 (see Table 3) at these observation points when there was no error. Here, Table 3 is a table summarizing the influence of the positioning error of the reflector 230 and the incident angle error of the reflected light beam L221 to the first light reception part 212 on the received light intensity at each of the measurement points A to E. The description of the "observation points" in this table is the same as that in Table 1 of Example 1. It has been found from Table 3 that the shape of the reflector 230 of Example 2 also allows the errors other than parallel movement in the z-axis direction to be detected as changes in the received light intensity ratio between the observation points. The results of correction of errors conform to those in Example 1.

Example 3

Figure 4:
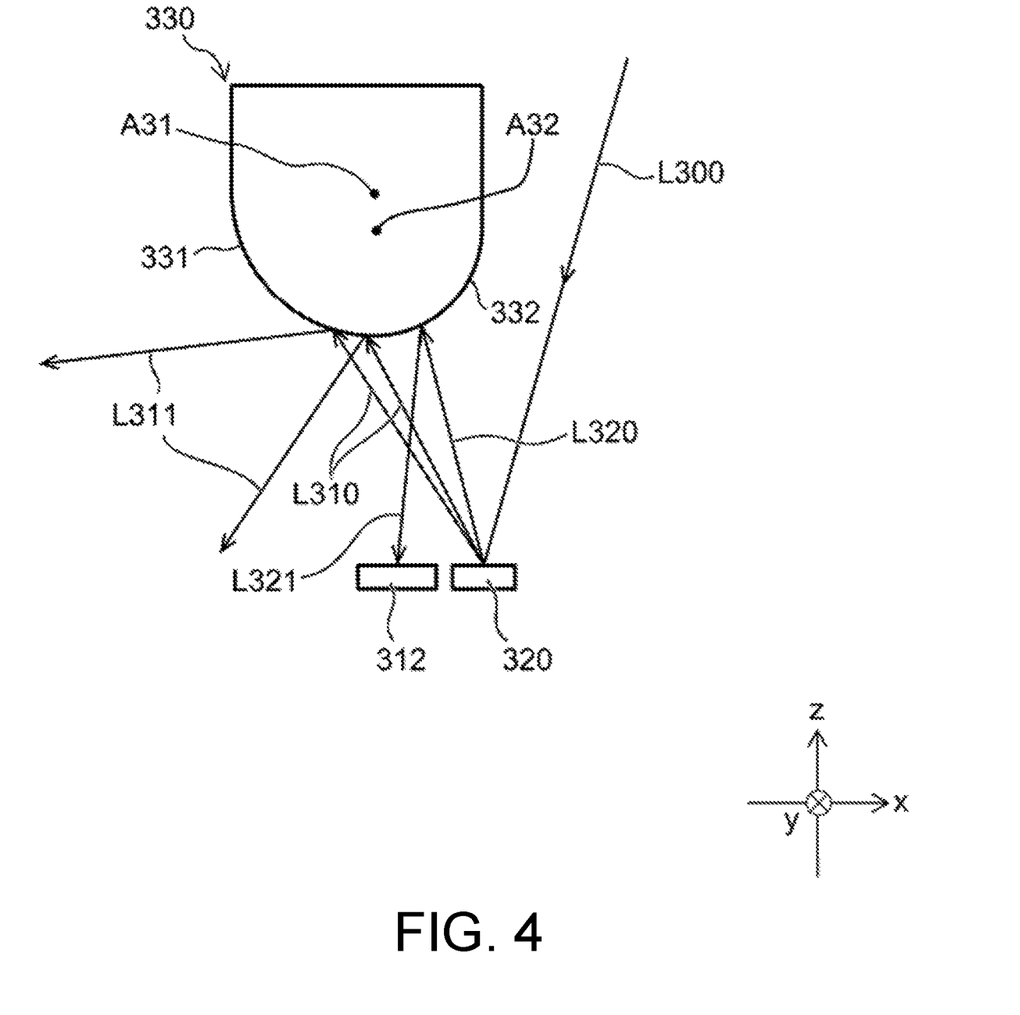
FIG. 4 is a diagram illustrating the configuration of a light emission apparatus according to Example 3.

FIG. 4 is a diagram illustrating the configuration of a light emission apparatus according to Example 3. Table 4 is a table which lists the simulation results obtained by the configuration of the light emission apparatus according to Example 3.

The schematic configuration of the light emission apparatus of Example 3 will be described.

As illustrated in FIG. 4, the light emission apparatus according to Example 3 comprises a light modulation unit 320, a reflector 330, a first light reception part 312, and a light source which is not illustrated. The reflector 330 has a first reflection surface 331 and a second reflection surface 332. An emitted light beam L300 from the light source is incident on the light modulation unit 320, which emits modulated light beams L310 and an unmodulated light beam L320. The modulated light beams L310 are incident on the first reflection surface 331 of the reflector 330 and emitted as reflected light beams L311 to the object side. The unmodulated light beam L320 is incident on the second reflection surface 332 of the reflector 330 and incident on the first light reception part 312 as a reflected light beam L321. Here, the first light reception part 312 and the light modulation unit 320 were disposed on the same plane.

Conditions and results of simulations listed in Table 4 will then be described. The reflector 330 comprises the first reflection surface 331 and the second reflection surface 332 which are formed of a resin material. The first reflection surface 331 is formed as a part of a spherical surface having a radius of 4 mm. The second reflection surface 332 is formed such that one circular end surface of a cylinder having a radius of 4 mm and a height of 3 mm is rounded with a radius of 3 mm (center A32). The second reflection surface 332 is joined with the first reflection surface 331 such that the center A31 of the sphere constituting the first reflection surface 331 is located on the center axis of the cylindrical second reflection surface 332. In this joint, the end surface which is other end surface than the end surface rounded with a radius of 3 mm, out of the circular end surfaces at both ends of the cylindrical shape of the second reflection surface 332, is joined with the first reflection surface 331. Metal plating was applied to the surfaces of the first reflection surface 331 and the second reflection surface 332 to form mirror surfaces.

TABLE 4

Example 3 Received light intensity of photosensor array

| | Observation point | | | | |
|---|---|---|---|---|---|
| | A | B | C | D | E |
| Without error | 1.00 | 0.79 | 0.79 | 0.79 | 0.79 |
| x + 0.1 mm | 0.62 | 0.96 | 0.34 | 0.34 | 0.48 |
| x − 0.1 mm | 0.62 | 0.24 | 0.68 | 0.68 | 0.48 |
| y + 0.1 mm | 0.61 | 0.48 | 0.87 | 0.26 | 0.95 |
| y − 0.1 mm | 0.61 | 0.48 | 0.26 | 0.87 | 0.24 |
| z + 0.1 mm | 0.92 | 0.96 | 0.62 | 0.62 | 0.72 |
| z − 0.1 mm | 0.97 | 0.91 | 0.70 | 0.70 | 0.76 |
| Beam incident angle Elevation angle +0.2° | 0.99 | 0.78 | 0.85 | 0.71 | 0.87 |
| Beam incident angle Elevation angle −0.2° | 0.99 | 0.78 | 0.71 | 0.85 | 0.70 |
| Beam incident angle Azimuth angle +0.2° | 0.11 | 0.37 | 0.04 | 0.04 | 0.08 |
| Beam incident angle Azimuth angle −0.2° | 0.20 | 0.04 | 0.29 | 0.29 | 0.15 |

As in Example 1, a reflection-type spatial light modulator was selected as the light modulation unit 320, and a cover glass as the transmission part having a thickness of 0.7 mm and a refractive index of 1.50 was disposed on the light source side of the spatial light modulator.

As in Example 1, the light source (not illustrated) was set to emit a Gaussian beam having a radius of 200 μm. The emitted light beam L300 from the light source is incident on the light modulation unit 320. In the example illustrated in FIG. 4, two modulated light beams L310 having emission angles different from each other are incident on different positions of the first reflection surface 331 of the reflector 330, and respective reflected light beams travel in directions different from each other. The unmodulated light beam L320 is primarily incident on the second reflection surface 332.

Also in Example 3, as in Example 2, the coordinate system was defined to describe the positional relationship of the entire light emission apparatus. Setting of the point of origin, x axis, y axis, and z axis and the unit of the coordinate system are the same as those in Example 2.

The reflector 330 was arranged so that the second reflection surface 332 was disposed on the side closer to the point of origin and the first reflection surface 331 was disposed on the side farther from the point of origin. The coordinate of the center A31 of the first reflection surface 331 was set to (4.7, 0, 54).

The Gaussian beam emitted from the light source was made incident on the light modulation unit 320 with a vector (0.087, 0, 0.996) so that the center of the Gaussian beam faced the point of origin.

The first light reception part 312 (photosensor array) was disposed on a position of z=0 mm so as to be parallel to the xy plane. In this first light reception part, five observation points were defined: A (−4.8, 0, 0), B (−1.7, 0, 0), C (−4.9, 1.5, 0), D (−4.9, −1.5, 0), and E (−4.8, 2.0, 0). The received light intensity ratio of the reflected light beam L321 of the unmodulated light beam L320 was 1:0.79:0.79:0.79:0.79 (see Table 4) at these observation points when there was no error. It has been found from Table 4 that the shape of the reflector 330 of Example 3 also allows the errors other than parallel movement in the z-axis direction to be detected as changes in the received light intensity ratio between the observation points. The results of correction of errors conform to those in Example 1.

The present invention has been described with reference to the above embodiments, but the present invention is not limited to the above embodiments and can be modified or altered for the purpose of modification or within the concept of the present invention.

INDUSTRIAL APPLICABILITY

As described above, the light emission apparatus according to the present invention is useful in that the light can be emitted over a wide angular range without requiring highly accurate adjustment of the light emission angle and with a simple configuration at reduced cost. Moreover, the present invention can provide an object information detection apparatus and an object information detection method that are able to execute highly accurate object information detection over a wide angular range with a simple configuration at reduced cost. Furthermore, the optical path adjustment method according to the present invention can accurately adjust the optical path of the emitted light over a wide angular range with a simple configuration at reduced cost. In addition, the light modulation unit according to the present invention is useful in that the light emission angle can be easily adjusted and the modulated light can be emitted over a wide angular range with a simple configuration at reduced cost.

The invention claimed is:

1. A light emission apparatus comprising: a light source that emits coherent light; a light modulation unit; a reflector; and a first light reception part, wherein
    the reflector comprises: a first reflection surface that is a part of a spherical surface; and a second reflection surface that is different from the first reflection surface,
    modulated light modulated by the light modulation unit is incident on the first reflection surface and its reflected light is emitted to an object, and
    unmodulated light that is not modulated by the light modulation unit and is reflected from the light modulation unit is incident on the second reflection surface and its reflected light is received by the first light reception part.

2. The light emission apparatus as recited in claim 1, wherein the second reflection surface is a flat surface or a curved surface that has a curvature different from that of the first reflection surface.

3. The light emission apparatus as recited in claim 2, wherein a position of the center of curvature of the first reflection surface is same as that of the second reflection surface.

4. The light emission apparatus as recited in claim 1, wherein the second reflection surface is a part of a spherical surface that forms the first reflection surface and provided in a region different from that of the first reflection surface.

5. The light emission apparatus as recited in claim 1, wherein
the modulated light modulated by the light modulation part is incident on the first reflection surface, and
the unmodulated light that is not modulated by the light modulation part and is reflected by the transmission part or the light modulation part is incident on the second reflection surface.

6. The light emission apparatus as recited in claim 5, wherein
the light modulation part is a spatial light modulator that modulates incident light and emits the modulated light, and
the transmission part is a cover glass disposed on an incident surface of the spatial light modulator.

7. The light emission apparatus as recited in claim 5, wherein
the light modulation unit is a liquid crystal panel or an Liquid Crystal On Silicon that has a liquid crystal layer, and
the transmission part includes one or more plate materials having transparency that are disposed on the light source side than the liquid crystal layer.

8. The light emission apparatus as recited in claim 5, wherein
the light modulation unit is a microelectromechanical system that includes a plurality of movable mirrors, and
the transmission part includes one or more plate materials having transparency that are disposed on the light source side than the movable mirrors.

9. The light emission apparatus as recited in claim 5, wherein the transmission part has a transmissivity of 80-95% for a component of incident light having a high transmission factor.

10. The light emission apparatus as recited in claim 5, wherein the transmission part has a reflectance of 3-20% for incident light at an interface with air.

11. The light emission apparatus as recited in claim 1, wherein the spherical surface is a part of a convex mirror having a convex surface facing the object side or a part of a concave mirror having a concave surface facing the object side.

12. The light emission apparatus as recited in claim 1, wherein the light source is a laser light source.

13. The light emission apparatus as recited in claim 12, comprising:
a collimating optical system that collimates emitted light from the laser light source into collimated light and emits the collimated light to the light modulation unit.

14. The light emission apparatus as recited in claim 1, comprising:
a state detection part that detects a state of the reflector on a basis of a light reception result obtained in the first light reception part; and
a modulated light adjustment part that controls the modulated light on a basis of a detection result obtained by the state detection part.

15. The light emission apparatus as recited in claim 14, wherein the modulated light adjustment part controls the light modulation part so as to change an emission direction of the modulated light from the light modulation part on the basis of the detection result obtained by the state detection part.

16. The light emission apparatus as recited in claim 14, wherein the modulated light adjustment part adjusts a direction of the reflector so as to change a reflection direction of the modulated light at the first reflection surface on the basis of the detection result obtained by the state detection part.

17. An object information detection apparatus comprising:
the light emission apparatus as recited in claim 1;
a second light reception part that receives the modulated light reflected from the object; and
an object information detection part that detects object information of the object on a basis of a light reception result obtained in the second light reception part.

18. The object information detection apparatus according to claim 17 comprising:
a state detection part that detects a state of the reflector on a basis of a light reception result obtained in the first light reception part; and
a coordinate system setting part that sets a coordinate system on a basis of a detection result obtained by the state detection part,
wherein the object information detection part detects a position of the object in the coordinate system set by the coordinate system setting part, on the basis of the light reception result obtained in the second light reception part.

19. An optical path adjustment method for adjusting an optical path of a modulated light reflected and emitted by a reflector, when the modulated light modulated in a light modulation unit is emitted to be reflected by a reflector and emitted to an object,
the reflector comprising: a first reflection surface that is a part of a spherical surface; and a second reflection surface that is different from the first reflection surface,
the optical path adjustment method comprising:
an incident step in which coherent light is given to the light modulation unit, the modulated light modulated by the light modulation unit is incident on the first reflection surface, and unmodulated light that is not modulated by the light modulation unit and is reflected from the light modulation unit is incident on the second reflection surface;
a state detection step in which a state of the reflector is detected on a basis of reflected light from the second reflection surface; and
a step in which the modulated light is controlled on a basis of the state of the reflector detected in the state detection step.

20. An object information detection method comprising:
giving coherent light to the light modulation unit, causing the modulated light modulated by the light modulation unit to be incident on the first reflection surface, and causing unmodulated light that is not modulated by the light modulation unit and is reflected from the light modulation unit to be incident on the second reflection surface;
causing reflected light from the first reflection surface to be emitted to the object;
detecting a state of the reflector and setting a coordinate system on a basis of reflected light from the second reflection surface; and
detecting object information of the object on a basis of a light reception result of the modulated light reflected from the object.

* * * * *